United States Patent [19]
Kaufman et al.

[11] Patent Number: 5,475,763
[45] Date of Patent: Dec. 12, 1995

[54] METHOD OF DERIVING A PER-MESSAGE SIGNATURE FOR A DSS OR EL GAMAL ENCRYPTION SYSTEM

[75] Inventors: Charles W. Kaufman, Northborough; Radia J. Perlman, Acton, both of Mass.

[73] Assignee: Digital Equipment Corp., Patent Law Group, Maynard, Mass.

[21] Appl. No.: 203,740

[22] Filed: Feb. 28, 1994

Related U.S. Application Data

[63] Continuation of Ser. No. 86,595, Jul. 1, 1993, abandoned.

[51] Int. Cl.⁶ .................................. H04L 9/30; H04L 9/00
[52] U.S. Cl. .......................... 380/30; 380/23; 380/46; 380/49; 235/380
[58] Field of Search ........................ 380/23–25, 30, 380/49, 50, 46; 235/379, 380

[56] References Cited

U.S. PATENT DOCUMENTS

| | | | |
|---|---|---|---|
| 4,227,253 | 10/1980 | Ehrsam et al. | 380/45 |
| 4,910,773 | 3/1990 | Hazard et al. | 380/21 |
| 4,969,189 | 11/1990 | Ohta et al. | 380/25 |
| 4,995,082 | 2/1991 | Schnorr | 380/23 |
| 5,050,212 | 9/1991 | Dyson | 380/25 |
| 5,081,678 | 1/1992 | Kaufman et al. | 380/21 |
| 5,136,646 | 8/1992 | Haber et al. | 380/49 |
| 5,136,647 | 8/1992 | Haber et al. | 380/49 |
| 5,146,499 | 9/1992 | Geffrotin | 380/23 |
| 5,148,479 | 9/1992 | Bird et al. | 380/23 |
| 5,163,096 | 11/1992 | Clark et al. | 380/4 |

*Primary Examiner*—Bernarr E. Gregory
*Attorney, Agent, or Firm*—Christine M. Kuta; Kenneth F. Kozik

[57] ABSTRACT

A signature system, such as an El Gamal or DSS system, involving the use of a long-term secret number and a per-message secret number generates the per-message secret number without the use of a random number generator or non-volatile storage. The per-message secret number is generated by applying a one-way hash function to a combination of the long-term secret number and the message itself.

12 Claims, 2 Drawing Sheets

METHOD OF DERIVING A PER-MESSAGE SIGNATURE FOR A DSS OR EL GAMAL ENCRYPTION SYSTEM

This application is a continuation of application Ser. No. 08/086,595, filed Jul. 1, 1993, now abandoned.

FIELD OF THE INVENTION

This invention relates to the generation of a per-message signature used in verifying the authenticity of a message. More specifically, it relates to a public key signature protocol, e.g. El Gamel or DSS, employing a per-message random number which is a function of the message itself.

BACKGROUND OF THE INVENTION

Public key signature protocols are used to verify the signatures appended to messages and thereby verify the authenticity of those messages. Some of these protocols such as El Gamel and DSS, involve a long-term public-private number pair for each user and a per-message public-private number pair specific to each message. The long-term private number is known only to its "owner" while the long-term public number is disseminated at least to those who are to receive messages from the owner. The per-message private number is a random number available only to the owner, while the corresponding public number is transmitted to the message recipient.

Each signature is a function of the long-term private number, the per-message private number and the message itself. The recipient of the message can verify the authenticity thereof by applying a known mathematical algorithm to the long-term public number, the per-message public number, the signature and the message. With this arrangement one cannot compromise the system by intercepting the message and the signature and substituting a bogus message, since the verification algorithm will then fail to authenticate the signature.

More specifically, in an El Gamal system there are a base number g and a prime number p. The long-term public number $P_L$, is related to the long-term secret number, $S_L$ by $$P_L = (g^{S_L})_{(mod\ p)} \quad (1)$$

Similarly, the per-message public number, $P_M$, is related to the per-message secret number, $S_M$ by $$P_M = (g^{S_M})_{(mod\ p)} \quad (2)$$

In a typical El Gamel system the signature SIG for a message MSG is generated in accordance with the function:

$$SIG = ((S_L * MSG) + S_M)_{((mod(p-1))} \quad 3)$$

The signature is transmitted to the message recipient along with the per-message public number and, of course, the message itself. The recipient verifies the signature by applying a verification function to the signature, the message, the long-term public number and the per-message public number. The verification function will authenticate the signature only if the received message is identical with the original message used by the message originator in generating the signature.

In a system of this type it is essential that the per-message secret number be different for different messages. If it is the same, anyone who receives the signed messages, either legitimately or by interception, can derive the originator's long-term secret number and thereafter impersonate the owner of the number.

The generation of successive, different, per-message random numbers can be accomplished by means of a random-number generator. However, true random-number generators are relatively expensive to implement, especially in the context of low-cost devices, an example being a so-called "smart card" which might be used to "plug into" a system to obtain access thereto.

A pseudo-random-number generator can also be used to generate the single-message number. However, implementation of this arrangement requires the use of non-volatile read/write storage and inexpensive smart cards are incapable of such storage.

Accordingly, it is an object of the present invention to provide a signature system of the El-Gamal or DSS type incorporating novel generation of per-message random-numbers. A more specific object of the invention is to provide a signature arrangement in which the per-message number pair is essentially random in character and is generated without the use of read/write storage registers or hardware-implemented randomnumber generators.

BRIEF DESCRIPTION OF THE DRAWINGS

The above and further advantages of the invention may be better understood by referring to the following description in conjunction with the accompanying drawing, in which.

SUMMARY OF THE INVENTION

A signature assembled in accordance with the invention makes use of a per-message secret number, $S_M$ that is generated by combining the message with a secret number known only to the message originator with the message and applying a one-way hash function to the combination. The output of such a function is a fixed number of bits from which the input of the function cannot be derived. Nor, as a practical matter, can the input be obtained by trial and error. For example, given a length of 128 bits for the secret number, and assuming that the message is known to an intruder, the intruder would have to find one out of more than $10^{38}$ possible input bit combinations for the hash function. A trial-and-error approach to the derivation of this number would therefore not be expected to obtain the long-term secret number in any reasonable length of time. An example of a hash function that is suitable for this purpose is a message digest function such as that described by Rivest, "The MD-4 Message Digest Algorithm", *Advances in Cryptology—Crypto*, '90, Spruger-Verlag, LNCS.

This arrangement essentially guarantees that the per-message random number will be different from one message to the next, unless the messages are identical, in which case the number will not change. The latter feature is sometimes desirable. A criticism sometimes leveled at prior arrangements was that because the per-message random number always changed from one message transmission to the next, the signature would also change, even if the same message were repeated.

Although it is not necessary, we prefer to use the originator's long-term term secret number $S_L$ in generating the per-message secret number $S_M$, since it simplifies the system somewhat.

Generation of the per-message random number is easily accomplished in the context of a "Smart Card", since it does not require read/write storage as a conventional random-number generator.

DETAILED DESCRIPTION OF ILLUSTRATIVE EMBODIMENTS

Figure 1:
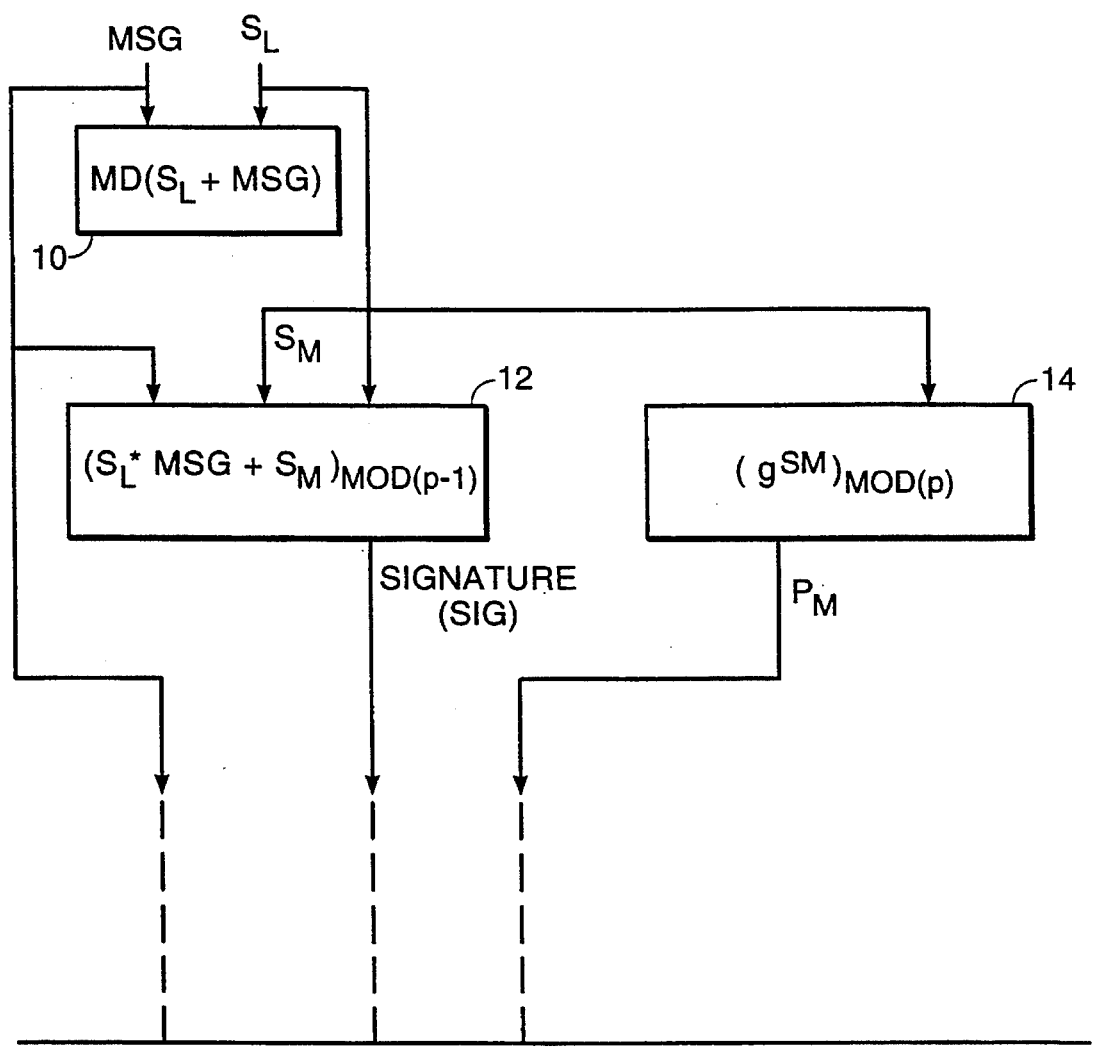
FIG. 1 is a flow diagram of a signature system operating in accordance with the invention.
Figure 1:
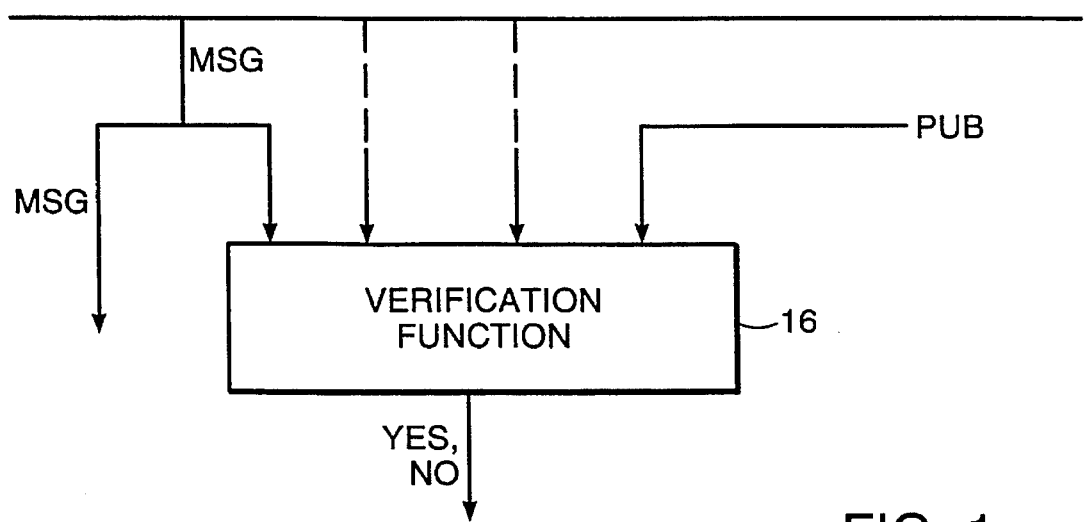

In FIG. 1 we have illustrated the incorporation of the invention in an El-Gamal signature verification system. The message, MSG, and its originator's long-term secret number, $S_L$ are applied to a one-way hash function indicated in box 10 to produce a per-message secret random number $S_M$. Specifically, in the preferred embodiment of the invention, the concatenation of $S_L$ and MSG is applied to a message digest function MD to provide the per-message secret random number $S_M$. The message MSG, the long-term number $S_L$, the per-message secret number $S_M$ and the prime number p, are applied to the signature function as indicated in box 12 to produce the signature, SIG.

Concurrently, $S_M$ is also applied to the function shown in box 14 to produce the per-message public number $P_M$. Finally, the message MSG, the signature SIC, and the per-message public number $P_M$ are transmitted to the intended recipient.

At the receiving end the incoming message MSG, signature SIG, the per-message public number $P_M$ and the message-originator's long-term public number $P_L$ are applied to a known verification function as indicated in box 16. If the message, signature and per-message public number have arrived intact, the verification function will verify the signature and thereby authenticate the message. On the other hand, if the message has been surreptitiously altered or replaced, or sent in the first place by an impostor, the verification function will fail to verify the signature and the recipient will therefore know that the message may not be authentic.

Figure 2:
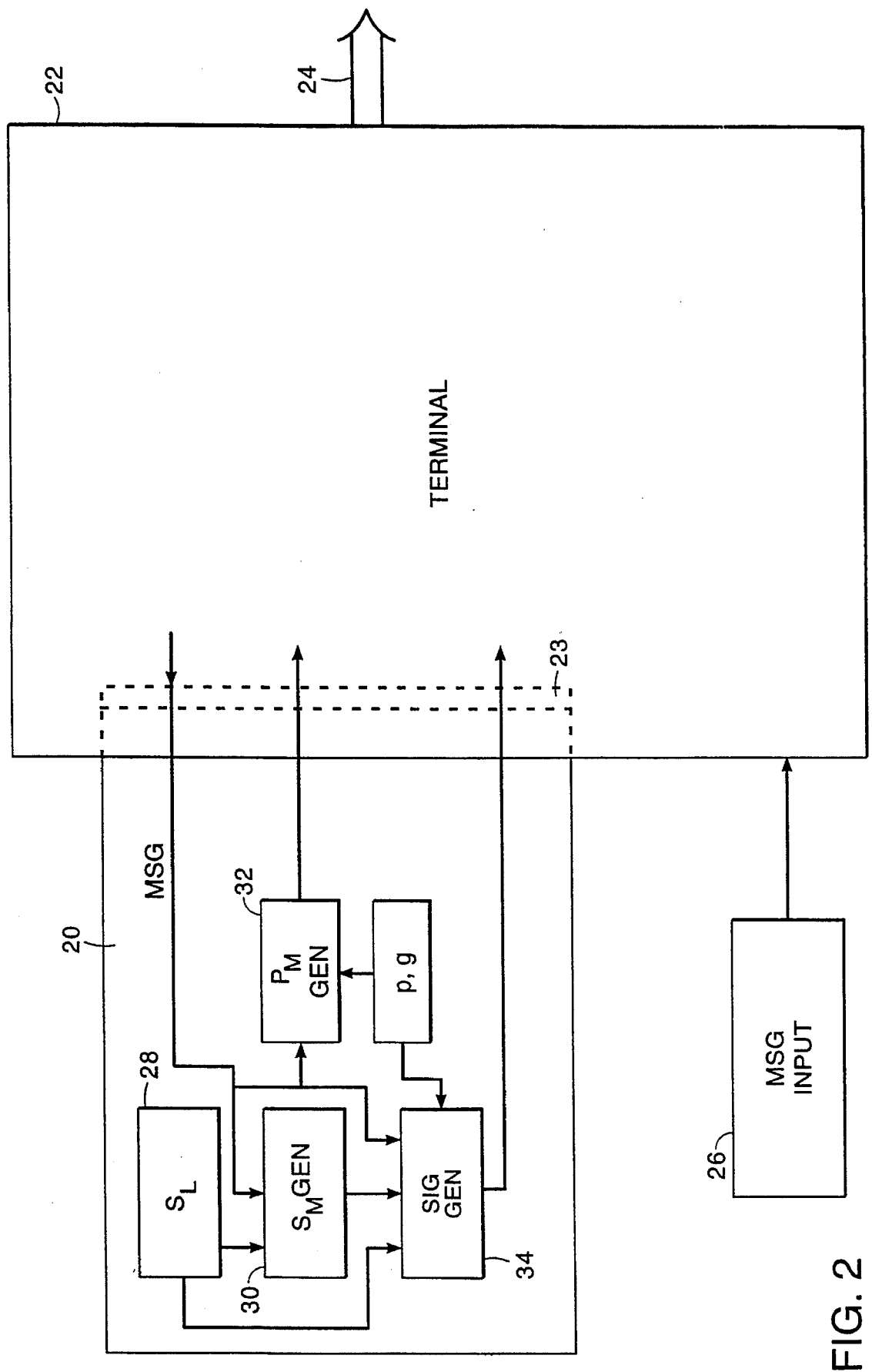
FIG. 2 is a diagram of a smart card message-authentication arrangement embodying the invention.

FIG. 2 illustrates a typical application of the invention to a smart card arrangement which is used to validate access to a data processing system or to a network of such systems. Each authorized user has a smart card 20 that is specific to that user. The card 20 "plugs into" a terminal 22 to establish two-way communication between the card and the terminal at an interface 23. The terminal in turn is connected to other units of the system by way of a communications link indicated at 24. The terminal also is provided with a keyboard 26, by means of which the user can enter messages into the terminal for transmission over the link 24.

The card 20 includes a register 28 which contains the long-term secret number $S_L$ specific to the card owner. A generator 30 in the card generates the short-term random number $S_M$ from $S_L$ and the message MSG, the message having been entered into the terminal 22 by means of the keyboard 26, for example. A generator 32 generates the public number $P_M$ and a generator 34 generates the signature SIC. The recipient of the message, whether it be a process in the terminal 22 or a recipient to which the message is communicated by means of the link 24, can authenticate the message in accordance with a known algorithm. The generators 30, 32 and 34 may, of course, be implemented by means of software modules stored in the card 20 and executed on a microprocessor (not shown) also contained on the card.

As pointed out above, generation of the per-message secret number is readily accomplished without resort to read/write storage or a conventional random-number generator. Moreover, the number will not be used in different messages, which is required to avoid unauthorized calculation of the user's long-term secret number. On the other hand the per-message number and signature will be repeated if the message is repeated, which is also a desirable feature.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A message authentication system of the type in which a signature of an originator of a message MSG, hereinafter the message originator, is transmitted to a recipient of the message and verified by the recipient, the message originator having a secret number $S_L$ and a corresponding public number $P_L$, said system comprising:

means for receiving the MSG;

means for generating a secret message for each message, a per-message secret number, $S_M$ by applying a one-way hash function to a combination of MSG and a generated secret number of the message originator, means for generating a signature as a function of $S_L$, $S_M$ and MSG.

2. The system defined in claim 1 further including:

means for generating a per-message public number $P_M$ as a function of $S_M$, and means for transmitting, to the recipient, the message, the signature and the per-message public number;

means for receiving, by the recipient, the message, the signature and the per-message public number.

3. The system defined in claim 2 including means for the message recipient to verify the signature SIG in accordance with a function of MSG, SIG, $P_L$ and $P_M$.

4. The system of claim 1 in which said one-way hash function is a message digest function.

5. A message authentication system comprising:

A. a data terminal including:
      1. means for receiving a message input and
      2. means for communicating with a smart card, and
   B. the smart card configured to communicate with said terminal and including:
      1. means for storing a secret number specific to an owner of the smart card,
      2. means for generating a secret number for each message, hereinafter referred to as a per-message secret number by, applying a one-way hash function to a combination of (a) a secret number specific to the owner of the smart card and (b) a message received by said terminal by way of said message input means,
      3. means for generating a signature as a function of said secret number, said per-message secret number and said message,
      4. means for generating a per-message public number as a function of said per-message secret number;
      5. means for transmitting to said terminal the signature and the per-message public number; and
      6. means for verifying in the terminal.

6. The system defined in claim 5 in which said one-way hash function is a message digest function.

7. The system defined in claim 5 in which said combination is a concatenation of the secret number and the message.

8. A smart card for use in authenticating messages, said smart card including:

A. means for storing a secret number specific to an owner of the smart card,

B. means for receiving a message to be authenticated,

C. means for generating a secret number for each message, hereinafter referred to as a per-message secret number, by applying a one-way hash function to a combination of said message and a secret number specific to said owner, D. means for generating a signature as a function of said secret number, said per-message secret number and said message, and E. means for transmitting said signature to a recipient.

9. The smart card defined in claim 8 in which said combination is a concatenation of said secret number and said message.

10. The smart card defined in claim 8 further including:

A. means for generating a per-message public message as a function of said per-message secret number, and B. means for transmitting said per-message public number.

11. A method for enabling verification of an originator of a message, said method comprising the steps of:

A. generating a secret number for each message, hereinafter referred to as a per-message secret number, by applying a one-way hash function to a concatenation of said message with a secret number specific to the originator of the message, B. generating a signature as a function of a secret number specific to the originator of the message, the short-term secret number, and the message; and C. transmitting said signature and the message to a recipient for verification.

12. The method defined in claim 11 including the further steps of:

A. generating a per-message public number as a function of the per-message secret number and B. transmitting said per-message public number to the recipient.

* * * * *